United States Patent
Hess et al.

(10) Patent No.: US 7,586,204 B2
(45) Date of Patent: Sep. 8, 2009

(54) PERMANENT MAGNET ALTERNATOR SPEED DETECTION CIRCUIT WITH FEEDBACK AT LOWER SPEEDS

(75) Inventors: Gary L. Hess, Enfield, CT (US); James A. Gosse, Storrs, CT (US); Carl J. Alleva, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 97 days.

(21) Appl. No.: 12/017,387

(22) Filed: Jan. 22, 2008

(65) Prior Publication Data

US 2009/0184522 A1 Jul. 23, 2009

(51) Int. Cl.
*F03D 11/02* (2006.01)
(52) U.S. Cl. .................................. 290/40 A
(58) Field of Classification Search ................ 290/40 A
See application file for complete search history.

(56) References Cited

U.S. PATENT DOCUMENTS

| | | | | |
|---|---|---|---|---|
| 4,139,780 A | * | 2/1979 | Hucker et al. | 307/86 |
| 4,254,344 A | | 3/1981 | Fancy et al. | |
| 5,036,267 A | * | 7/1991 | Markunas et al. | 322/10 |
| 5,055,764 A | * | 10/1991 | Rozman et al. | 322/10 |
| 5,546,742 A | * | 8/1996 | Shekhawat et al. | 60/788 |
| 5,929,612 A | * | 7/1999 | Eisenhaure et al. | 322/47 |
| 6,153,942 A | * | 11/2000 | Roseman et al. | 290/47 |
| 6,177,734 B1 | * | 1/2001 | Masberg et al. | 290/31 |
| 6,351,090 B1 | * | 2/2002 | Boyer et al. | 318/139 |
| 6,481,406 B2 | * | 11/2002 | Pels | 123/179.3 |
| 6,769,874 B2 | | 8/2004 | Arel | |
| 6,838,779 B1 | | 1/2005 | Kandil | |
| 6,920,023 B2 | | 7/2005 | Dooley | |
| 7,119,467 B2 | | 10/2006 | Dooley | |
| 7,224,147 B2 | | 5/2007 | Shah | |
| 7,253,535 B2 | | 8/2007 | Duesterhoeft | |
| 7,262,537 B2 | | 8/2007 | Worley | |
| 7,272,514 B2 | | 9/2007 | Qi | |
| 7,292,003 B1 | | 11/2007 | Baker | |

OTHER PUBLICATIONS

Search and Examination Report dated May 22, 2009.

* cited by examiner

*Primary Examiner*—Joseph Waks
(74) *Attorney, Agent, or Firm*—Carlson, Gaskey & Olds P.C.

(57) ABSTRACT

A permanent magnet alternator is driven by a turbine engine to supply three phases of power to a control circuit for the engine. A shunt regulator delivers current to the control circuit, and a voltage supply is also included to deliver power for a period of time as the alternator is gaining speed at startup. A speed detection circuit detects the speed of the shaft for diagnostic purposes and a feedback circuit overrides a control for the supply of the current at lower speeds such that the speed detection circuit will be accurate even at lower speeds.

9 Claims, 3 Drawing Sheets

PERMANENT MAGNET ALTERNATOR SPEED DETECTION CIRCUIT WITH FEEDBACK AT LOWER SPEEDS

BACKGROUND OF THE INVENTION

This application relates to a permanent magnet alternator such as is incorporating into a turbine engine, wherein a speed detection circuit detects the speed of the shaft of the engine, and there is an override to make speed detection more accurate at lower speeds.

Turbine engines, such as gas turbine engines for airplanes, include control circuits for controlling various accessory features for the engine. As an example, the power generated by generators associated with the engine must be properly controlled and routed, and various accessory functions such as lubricant supply, fuel supply, water supply, etc. must all be controlled.

It is known to supply an alternator for generating electricity based upon the rotation of the shaft to supply this control circuit. In addition, it is known to supply a separate voltage source such that this control circuit can be controlled until the shaft speed reaches a speed such that adequate current is generated by the alternator. Some form of supplying the power from the voltage source until the shaft reaches an acceptable speed is typically included. As an example, it is known to use diodes to supply the higher of the two voltages.

It is also known to include a current sense point for sensing the supplied current and utilizing the sensed current to predict the speed of the shaft for various diagnostic or control functions.

However, the control for a shunt regulator which controls the flow of the current to the control for the engine typically prevents flow of current at times when the voltage will not exceed the voltage of the voltage source. Thus, at lower speeds, a speed detection circuit can often not detect the speed of the shaft, as no current is being delivered.

SUMMARY OF THE INVENTION

In a disclosed embodiment, a permanent magnet alternator is driven by a turbine engine to supply three phases of power to a control circuit for the engine. A shunt regulator delivers current to the control circuit, and a voltage supply is also included to deliver power for a period of time as the alternator is gaining speed at startup. A speed detection circuit detects the speed of the shaft for diagnostic purposes and a feedback circuit overrides a control for the supply of the current at lower speeds such that the speed detection circuit will be accurate even at lower speeds.

These and other features of the present invention can be best understood from the following specification and drawings, the following of which is a brief description.

DETAILED DESCRIPTION OF THE PREFERRED EMBODIMENT

Figure 1:
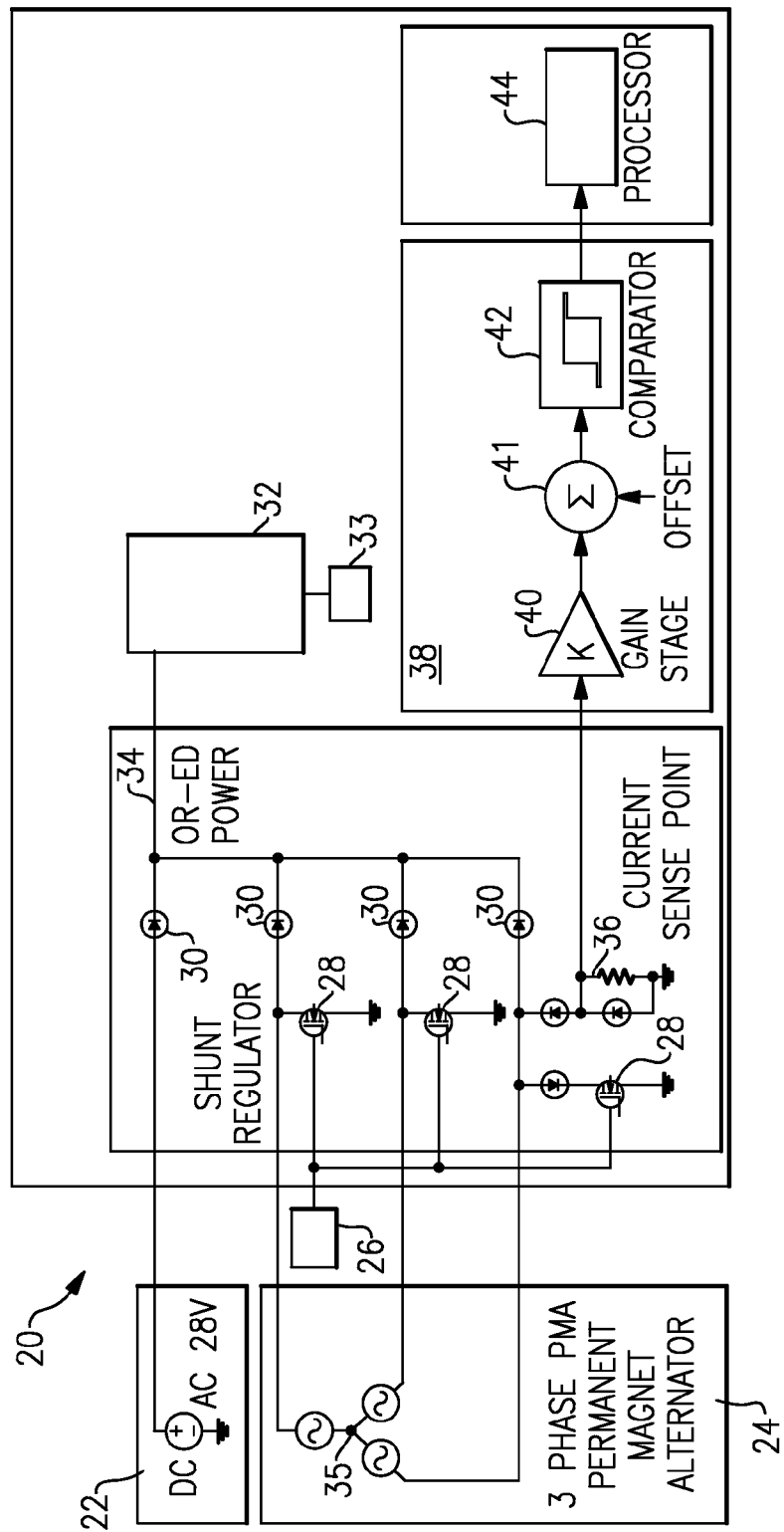
FIG. 1 shows a prior art control circuit.

A known permanent magnet alternator circuit 20 is illustrated in FIG. 1. As known, a voltage source 22 supplies a voltage, such as 28 volts, to a downstream load, such as a control 32 for an engine 33, shown schematically. The engine 33 includes a shaft 35 shown schematically as part of the permanent magnet alternator, and which rotates to generate current within the permanent magnet alternator 24.

A pulse width modulation control 26 controls a plurality of switches 28 which provide a shunt regulator for the three phases of current being supplied to the control circuit 32 for the engine 33. A plurality of diodes 30 effectively provide an or gate to either supply power from the voltage source 22 or from the current source 24. When the voltage which would be supplied through the shunt regulator switches 28 from the current source 24 would exceed voltage from the voltage source 22, then that current is delivered to the control 32. Until that point, voltage will flow from the voltage source 22. Essentially, the voltage source 22 is typically required as the engine 33 is moving up the speed.

A current sense point 36 provides a current signal to a downstream speed conversion circuit 38. A gain stage 40 delivers a signal to an offset element 41, a comparator 42, and to a processor 44 which processes the speed signal. This speed signal can be utilized for various diagnostic purposes and is indicative of the speed of the engine.

However, the pulse width modulation control 26 effectively blocks current flow at low speed operation. As such, there is effectively no current reaching the circuit 38. Thus, at lower speeds, the circuit 38 is not providing any accurate indication of the speed of the engine.

Figure 2:
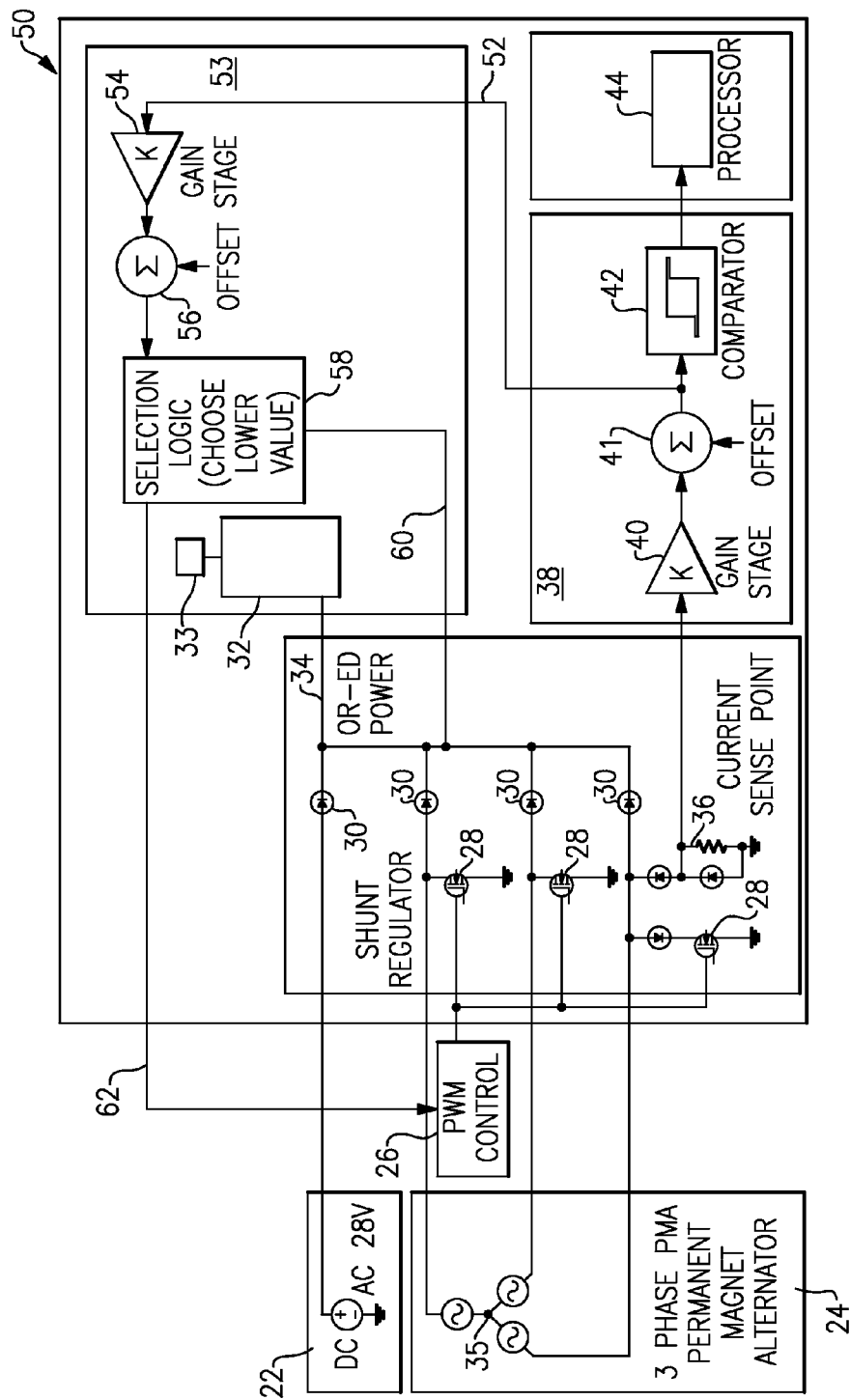
FIG. 2 shows the inventive control circuit.

A circuit 50 is shown in FIG. 2 and improves upon this existing system. As shown, feedback point 52 provides a signal to a feedback circuit 53. A gain stage and filter 54 receives the signal, passes it to an offset element 56, and to a selection logic 58. Selection logic 58 receives a signal 60 indicative of the current delivered through the shunt regulator switches 28. If this voltage is below the voltage supplied by the voltage source 22, than a signal 62 is sent to the pulse width modulation control 26 indicating that the pulse width modulation control 26 should allow additional current to flow through the shunt regulator switches. As the current increases, the speed conversion circuit 38 will be able to identify the speed of the shaft 35, and thus will provide engine speed information even at low speeds.

Once the voltage delivered on line 60 exceeds the voltage from a voltage source 22, the selection logic 58 will stop its feedback signal to the pulse width modulation control 26 through the line 62. The system will then operate entirely as in the prior art.

Figure 3:
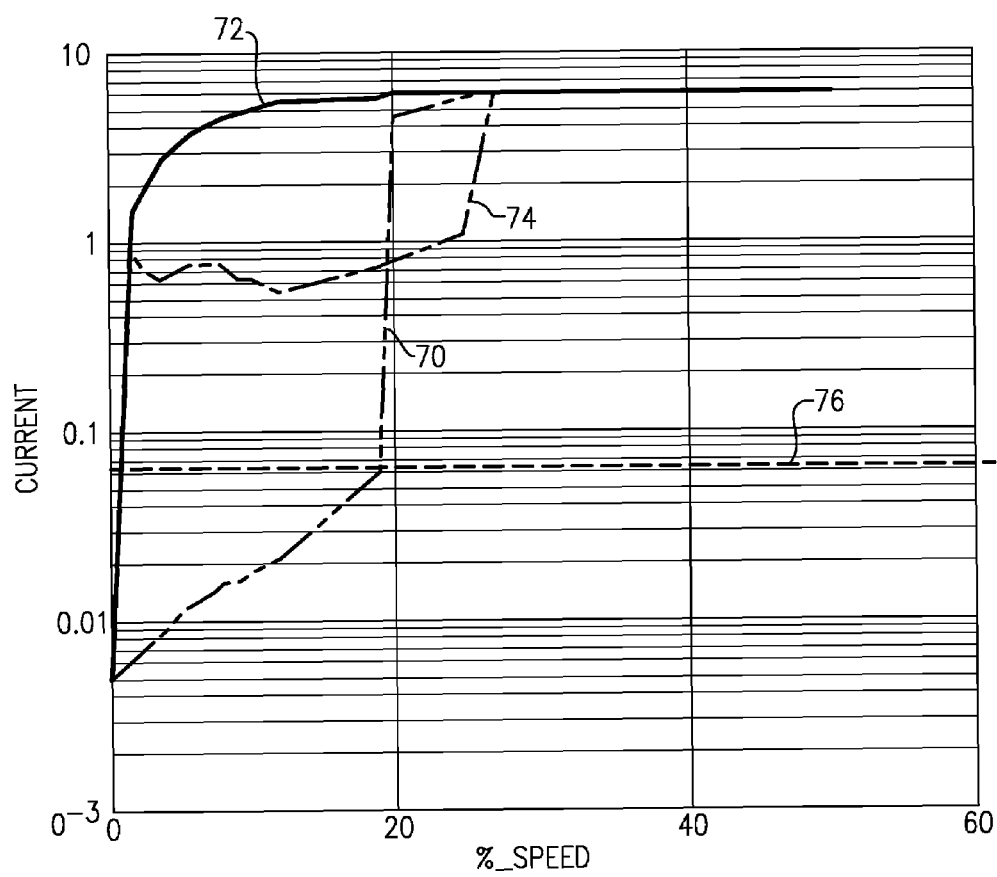
FIG. 3 graphically shows benefits from the inventive circuit.

As shown in FIG. 3, the prior art system was capable of delivering current at line 72. However, the actual current provided to the speed detection circuit is shown by line 70, due to the prior art control of the pulse width modulation control. Line 76 shows the minimum current which is necessary for a reliable speed determination to be provided. The present invention provides a signal such as shown at 74, which provides more detailed information at lower speeds.

Although embodiments of this invention have been disclosed, a worker of ordinary skill in this art would recognize that certain modifications would come within the scope of this invention. For that reason, the following claims should be studied to determine the true scope and content of this invention.

What is claimed is:
1. A permanent magnet alternator comprising:
a shaft driven to rotate, and to generate electricity in windings, and to supply current to a speed detection circuit for detecting a speed of said shaft, and for providing power to a control circuit for a gas turbine engine;

a shunt regulator between said windings and said control circuit;

a source of voltage to be supplied to the control circuit, and elements for delivering voltage from said source of voltage to the control circuit when a voltage that would be supplied from said shunt regulator would be below a voltage from the voltage source, and for delivering current through said shunt regulator when a voltage delivered from said shunt regulator would be above said voltage from said voltage source; and feedback from said speed detection circuit provided to a control for said shunt regulator to adjust the current delivered from said shunt regulator upwardly if the speed is not being accurately sensed at said speed detection circuit.

2. The permanent magnet alternator as set forth in claim 1, wherein a pulse width modulation control for said shunt regulator limiting current flow through said shunt regulator until a voltage to be delivered from said shunt regulator to said control circuit will exceed said voltage from the voltage source, and said speed detection circuit overriding said pulse width modulation control to cause the pulse width modulation control to allow current flow even when the voltage from said shunt regulator will be below the voltage supplied by the voltage supply.

3. The permanent magnet alternator as set forth in claim 2, wherein a feedback circuit including a selection logic stops the override of said pulse width modulation control once the voltage supplied from said shunt regulator exceeds the voltage from the voltage supply.

4. The permanent magnet alternator as set forth in claim 1, wherein said elements include diodes.

5. A gas turbine engine comprising:

a shaft driven to rotate by an engine, and to generate electricity in windings, and to supply current to a speed detection circuit for detecting a speed of said shaft, and for providing power to a control circuit for the gas turbine engine;

a shunt regulator between said windings and said control circuit;

a source of voltage to be supplied to said control circuit, and elements for delivering voltage from said source of voltage to said control circuit when a voltage supplied from said shunt regulator would be below a voltage from the voltage source, and for delivering current through said shunt regulator when the voltage delivered from said shunt regulator would be above the voltage of the voltage source; and feedback from said speed detection circuit provided to a control for said shunt regulator to adjust the current delivered from said shunt regulator upwardly if the speed is not being accurately sensed at said speed detection circuit.

6. The gas turbine engine as set forth in claim 5, wherein a pulse width modulation control for said shunt regulator limiting current flow through said shunt regulator until a voltage to be delivered from said shunt regulator to said control circuit will exceed said voltage from the voltage source, and said speed detection circuit overriding said pulse width modulation control to cause the pulse width modulation control to allow current flow even when the voltage from said shunt regulator will be below the voltage supplied by the voltage supply.

7. The gas turbine engine as set forth in claim 6, wherein a feedback circuit including a selection logic stops the override of said pulse width modulation control once the voltage supplied from said shunt regulator exceeds the voltage from the voltage supply.

8. The gas turbine engine as set forth in claim 5, wherein said elements include diodes.

9. A method of operating a permanent magnet alternator including:

(a) driving a shaft to rotate, and generating electricity, and supplying current to a speed detection circuit for detecting a speed of said shaft, and providing power to a control circuit for a gas turbine engine;

(b) delivering voltage from a source of voltage to said control circuit when a voltage supplied by said shaft is below a voltage of the voltage source, and for delivering current from said shaft when the voltage delivered by said shaft would be above the voltage of the voltage source; and (c) sending feedback from said speed detection circuit to a control to adjust the current delivered from said shaft upwardly if the speed is not being accurately sensed at said speed detection circuit.

* * * * *